Jan. 15, 1963 W. H. COWLES ET AL 3,073,115
FUEL CONTROL FOR A TWIN SPOOL GAS TURBINE ENGINE
Filed March 18, 1959 2 Sheets-Sheet 1

INVENTORS
WARREN H. COWLES &
BY DEAN F. WHEELER

Walter Pataroka, Jr.
ATTORNEY

Jan. 15, 1963     W. H. COWLES ET AL     3,073,115
FUEL CONTROL FOR A TWIN SPOOL GAS TURBINE ENGINE
Filed March 18, 1959     2 Sheets-Sheet 2

INVENTORS
WARREN H. COWLES &
BY DEAN F. WHEELER
Walter Patoroha, Jr.
ATTORNEY

United States Patent Office 3,073,115
Patented Jan. 15, 1963

3,073,115
FUEL CONTROL FOR A TWIN SPOOL GAS
TURBINE ENGINE
Warren H. Cowles and Dean F. Wheeler, Detroit, Mich.,
assignors to Holley Carburetor Company, Van Dyke,
Mich., a corporation of Michigan
Filed Mar. 18, 1959, Ser. No. 800,300
4 Claims. (Cl. 60—39.16)

This invention relates generally to fuel controls, and more specifically to fuel controls for turbine engines.

Gas turbine engines may be classified broadly into three groups such as (1) turbojet, (2) turboprop and (3) turboshaft. The turbojet engine is one which relies upon jet thrust to develop its propulsive force, whereas, a turboprop has its turbine shaft coupled to a propeller, as well as to the compressor, so as to develop its propulsive force by slightly increasing the velocity of a large mass of air. The turboshaft engine differs from the turboprop in that the turbine shaft is coupled to an output shaft which drives something other than a propeller. This output shaft may, for example, be a drive shaft for a land based vehicle such as a truck.

Each of these engines, although identical in many basic concepts, require different types of fuel controls. That is, they may require different methods by which the speeds of the related components such as compressor, turbine, propeller, output shaft, etc. can be detected and/or regulated.

In view of this, it is now proposed to provide a fuel control which can be readily adapted to a turboprop, turboshaft or turbojet engine without the necessity of any major rework with the possible exception of only minor changes in calibration.

Other more specific objects and advantages will become apparent when reference is made to the following specification and illustrations wherein.

Figure 1:
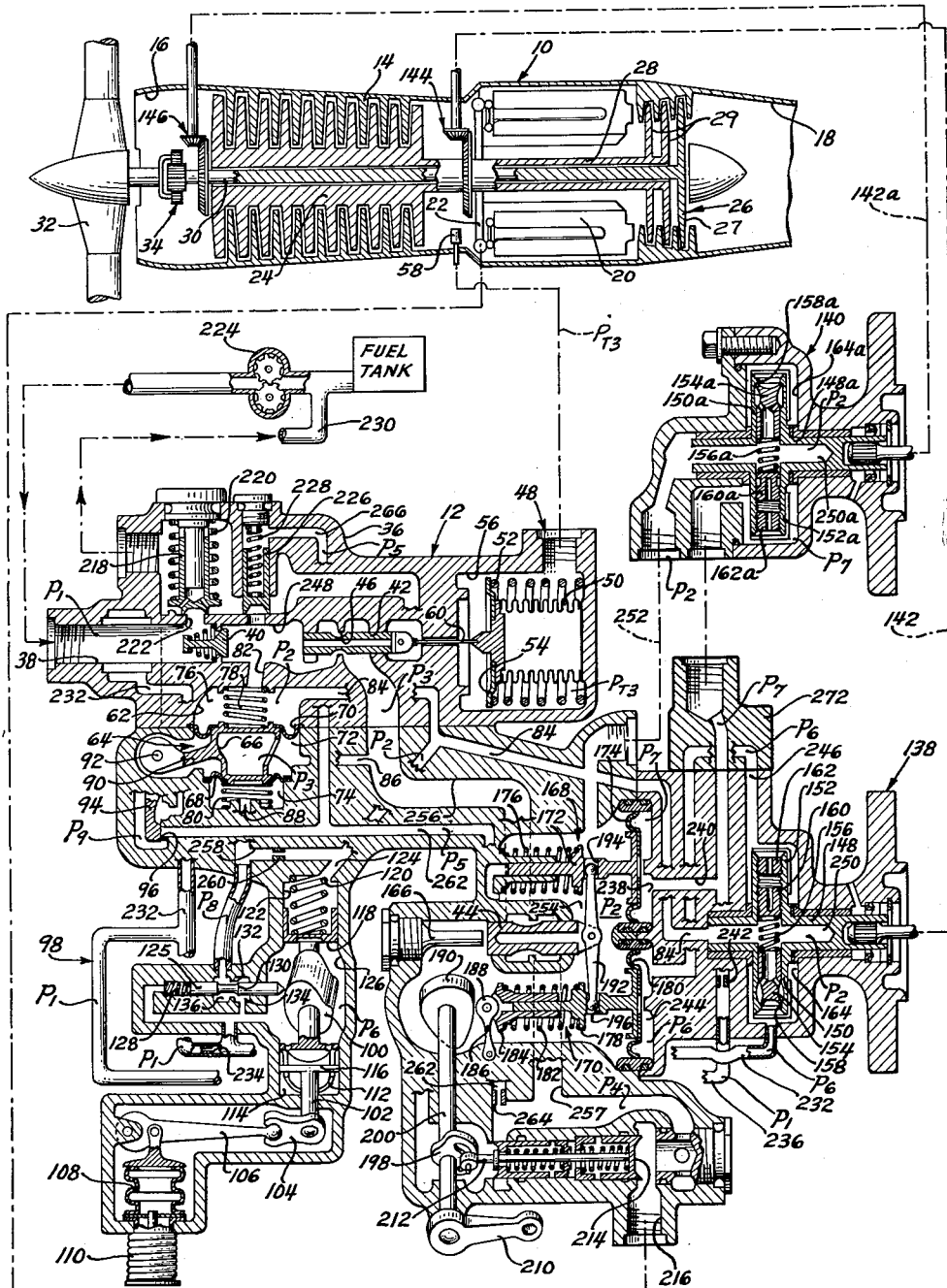
FIGURE 1 is a schematic illustration in cross-section of a fuel control embodying the invention, as used in conjunction with a typical turboprop engine.

Referring now in greater detail to the drawings, FIGURE 1 illustrates a turboprop or as sometimes called free-shaft turbine engine 10 whose fuel supply is controlled by the scheduling type of fuel control 12 embodying the invention. The engine 10 has a housing 14 with an air intake 16 and exhaust nozzle 18. A combustion chamber 20 having a fuel distribution ring 22 therein, is located within the housing 14 between the compressor 24 and turbine 26. The power plant illustrated is of the split turbine type which has its forward turbines 29 (compressor turbines or gas producer turbines) driving the compressor by means of a hollow shaft 28. The free turbine 27 drives a propeller, or, in the case of a turbofan engine, a fan 32 by means of a second shaft 30, concentric with 28, and a gear box 34. Since turboprop and turbofan engines are basically identical, it is evident that all considerations necessary for a successful fuel control for a turboprop would be the same as those for a turbofan fuel control. It is of course to be further understood that the invention is not limited to just this particular type of turboprop engine.

The fuel control 12, having a housing 36, contains a fuel inlet conduit 38 which in turn contains a pressure responsive valve 40 therein. A second contoured valve 42 allows the fuel to flow to the main metering valve 44 in accordance with its position with respect to the metering surfaces 46 as determined by the pressure sensing means 48.

The pressure responsive means 48 is generally comprised of an evacuated bellows 50 which is resiliently biased to the left by a spring 52 and a spring retainer 54 monuted on one end of the bellows. The chamber 56 which houses the pressure responsive means 48 communicates with a pressure probe 58 located within the power plant. Generally, the probe senses some compressor pressure; however, for purposes of illustration the probe is shown in a position to sense compressor discharge pressure $P_{t3}$ although it could sense any intermediate compressor pressure. A member 60, rigidly secured at its opposite ends to valve 42 and the free end of bellows 50 serves to more the valve 42 in accordance with the position of bellows 50.

Chamber 62 houses a double diaphragm valve 64 which is comprised generally of a double ended member 66 having diaphragms 68 and 70 secured thereto. The diaphragms, among other things, serve to divide the chamber 62 into three distinct and variable chambers 72, 74 and 76. Chambers 76 and 74 contain springs 78 and 80 respectively which bias the member 66 for purposes of calibration. Chamber 76 communicates with conduits 82 and 84, while chambers 72 and 74 communicate respectively with conduits 86 and 88. An arm 90, secured at one end to member 66 and pivotally mounted at its other end at 92 is rigidly secured to a servo valve 94 which cooperates with a seat 96.

A temperature sensing and compensating mechanism 98 is illustrated as having a three dimensional cam 100 which is rotatably positioned by means of a shaft 102, arm 104, lever 106 and a temperature responsive bellows 108. The temperature bellows of course derive their force from the expansion and contraction of the fluid which is sealed within the bellows 108 and temperature probe 110. A slotted member 112, piloted within the chamber 114 and secured to the cam 100, cooperates with the extended portions 116 of shaft 102 to rotate the cam 100 in accordance with the temperature.

The other side of cam 100 is connected to a piston 118 which is biased downwardly by a spring 120. Chamber 122, which contains piston 118, communicates with the pressure $P_2$ in conduit 124 while chamber 126 on the other side of piston 118 is at a pressure $P_6$. A hydraulic balanced valve 125, biased to the right by a spring 128, has a metering edge 130 cooperating with the edge 132 to cause a pressure differential between chambers 134 and 136 which is a function of the position of cam 100.

Two hydraulic speed sensing units 138 and 140 are connected to the turbine power plant at different points, The speed sense 138 is connected to the gas producer portion of the engine by means of transmission 142 and gear box 144; whereas, speed sense 140 is connected to the free turbine 27 by means of gear box 146. The speed sensing unit 138 is substantially comprised of a generally tubular center portion 148 which has secured thereto a pair of radially formed members 150 and 152. Member 150 contains a valve 154 which is normally urged radially outward by the biasing force of spring 156. The valve 154 is adapted to control the fluid flow through port 158 which is formed within member 150. A threaded spring seat adjustment 160 and counterweight 162 may be provided within member 152. A generally cylindrical chamber 164 surrounds the members 150 and 152 as they are rotated by the central tubular portion 148 and transmission 142. The speed sense 140 is similar in all respects to the speed sense 138; however, for sake of clarity the elements comprising unit 140 that are like or similar to those of unit 138 are identified with the same numerals followed by a letter "a" suffix.

Generally, the main fuel metering valve 44 is contoured to progressively increase fuel flow in accordance with increasing engine speeds. A mechanically adjustable stop member 166 provides a means for establishing the minimum fuel flow through valve 44. That is, the stop 166 will provide a minimum rate of fuel flow, regardless of engine requirements. All other positions of valve 44, other than minimum flow, are determined by the collective action of the pressure responsive members 168 and 170.

The member 168 is comprised of a main body portion 172, having a pilot at one end and a diaphragm 174 secured to its other end, and a spring 176 resiliently urging the body 172 and diaphragm to the right. Member 170 is similar to member 168 in that it also has a piloted body portion 178, diaphragm 180 and a spring 182. However, an important difference is that the spring pad 184 for spring 182 is movable, whereas the pad for spring 176 is fixed. The movable pad 184 is pivotally secured to an arm 186 which has a roller 188 in contact with a cam 190. The other end of arm 186 is pivotally secured to the housing 36.

A lever 192, pivotally and slidably received at its opposite ends within openings 194 and 196 formed in body portions 172 and 178, is pivotally secured to the main metering valve 44.

A bean-slotted cam 198 is secured to the power selector shaft 200 which has secured to it, at its opposite ends, cam 190 and the manually positioned selector lever 210. The cam 198 is used to actuate the cooperating rod 212 which closes the valve member 214 on engine shut down. Valve member 214, when closed, is to the right, thereby preventing further fuel flow through the outlet port 216 to the engine fuel manifold ring 22.

A maximum pressure valve 218 is provided with a spring 220 urging it in a downward position. As the pressure within conduit 38 increases above the design limits, valve 218, by virtue of its communication with conduit 38 through port 222, is forced upwardly against spring 220 so as to allow fuel to return to the intake side of pump 224. A maximum fuel limiter valve 226 is also resiliently urged downwardly by a spring 228. As fuel flow tends to exceed safe values, the valve 226, in cooperation with the servo valve 94, bypasses the excess fuel to the return line 230. The exact manner of operation will be more fully discussed later in the specification.

OPERATION

A brief discussion of the functioning of the fuel control during steady state engine operation will be presented first in order to illustrate the precise functions of the individual components.

Fuel at a pressure of $P_1$ is delivered by the pump 224 to the inlet 38 which communicates with a conduit 232. A restriction 234 placed within conduit 232 causes a pressure drop resulting in a pressure $P_6$ within chambers 126 and 164. It will become apparent later in the specification that $P_6$ is a variable pressure which is always less than $P_1$ and dependent on the speed of rotation of compressor 24. Pressure $P_6$ is then applied to chamber 244 by means of conduit 246 which is in communication with chamber 164. Conduit 236, branching off from conduit 232 anterior of restriction 234 and communicating with chamber 164a and chamber 238 by means of conduit 240, has a restriction 242 therein which causes the pressure $P_1$ to go to some value $P_7$ in both of said chambers.

Pressures $P_6$ and $P_7$ are each determined in a like manner by speed senses 138 and 140, respectively. For example, at relatively low rotational speeds of tubular portion 148 and arm members 150 and 152, pressure $P_6$ forces valve 154 inwardly toward the center of rotation against the resisting force of spring 156. Consequently, flow takes place quite readily through orifice 158, past valve 154 and into the cavity 250 which is at a pressure $P_2$.

Because of the low resistance to flow through orifice 158, the pressure $P_6$ approaches the lower pressure $P_2$ in value. However, as rotational speed of member 148 increases, due to an increase of compressor speed, the centrifugal force of valve 154 increases causing the valve to more nearly close off the orifice 158. Since there is now a greater restriction to flow through orifice 158, pressure $P_6$ increases and approaches the higher pressure $P_1$ as an absolute limit. In this manner, it is possible to obtain a hydraulic pressure signal which is indicative of speed. Generally speaking, the higher the speed, the higher pressures $P_6$ and $P_7$ become. Pressure $P_6$ is communicated to governor diaphragm chamber 244 by means of conduit 246, while pressure $P_7$ in chamber 164a is directed to governor diaphragm chamber 238 by means of conduit 240.

Fuel at pressure $P_1$ is also directed past valve 40, which maintains a relatively constant pressure drop, into chamber 248 where it exists at a new pressure $P_2$. The pressure $P_2$ is then communicated to chamber 76, by means of conduit 82, and subsequently to conduits 84 and 124 which communicate with chambers 250 and 122 respectively. Conduit 252, which intersects conduit 84, serves to communicate the pressure $P_2$ to chamber 250a of speed sense 140 and chamber 254 to the left of diaphragms 174 and 180.

The fuel at a pressure $P_2$ is then directed past the contoured valve 42, which cooperates with the metering surfaces 46 to produce a variable pressure drop resulting in a pressure $P_3$ in conduit 256. The position of valve 42 is determined by the compressor discharge pressure $P_{t3}$. Generally, as compressor discharge pressure increases, the pressure drop across the valve 42 decreases, causing $P_3$ to increase and approach $P_2$. The pressure $P_3$ is also communicated to chamber 72 by means of conduit 86.

Conduit 88, communicating between chambers 74 and 136, conveys fuel at a pressure $P_8$ which results from the pressure drop across metering edges 130 and 132 when the valve 125 is moved to some position by cam 100. Chamber 134, which communicates with chamber 126, is at a pressure $P_6$ which is greater than $P_8$. A conduit 258 hydraulically connecting conduit 88 with conduit 124 has a restriction 260 therein which, in effect, determines the pressure differential which may exist between $P_2$ and $P_8$.

During steady state, $P_{t3}$ will have moved valve 42, thereby determining $P_3$, and cam 100 will have moved axially in accordance with the pressure differential between $P_2$ and $P_6$. Furthermore, the cam 100 will be angularly adjusted in accordance with temperature by means of probe 110, bellows 108 and linkages 106, 104, 102 and 112. The position of cam 100 determines the position of valve 125, and consequently $P_8$ in chamber 74. $P_8$ is of course greater than $P_2$ or $P_3$.

Pressure $P_6$, determined by speed sense 138, is directed against diaphragm 180 while pressure $P_7$, determined by speed sense 140, is applied to diaphragm 174. The two pressures, independently of each other, urge their respective diaphragms and members 172 and 178 to the left. However, it should be clear, even though the actions are independent of each other, that the final movement imparted to valve 44 may be due to the collective actions of the members 172 and 178. It can readily be seen that the speed sense 140 can override the speed sense 138. That is, if the power turbine should overspeed, due possibly to some change in propeller pitch, the speed sense 140 will reduce fuel flow to the burners by more nearly closing off the valve 44. In this manner, the speed of the power turbine is reduced and consequently the speed of the propeller is maintained within safe limits.

*Engine Acceleration*

Generally, the fuel control also operates as outlined above during conditions of acceleration. However, a few of the elements making up the control are positioned differently. As more power is demanded, the operator rotates the power selector lever 210 counter-clockwise, thereby rotating cam 190 so that follower 188 is urged to the right. This causes the spring pad 184 to compress spring 182 in a manner so as to offer greater resistance to the force created by $P_6$. Member 178 of course moves to the right during this time, causing the lever 192 and valve 44 to move to a more nearly open position. When the desired power is obtained, $P_6$ will again become sufficient to establish a condition of equilibrium with spring 182 and $P_2$.

The maximum operating line or acceleration line (acceleration fuel flow plotted against engine speed) is determined by the action of servo valve 94. Once the operator selects an increase in power, valve 44 is moved to a more nearly fully open position to allow a greatly increased fuel flow to the engine. However, the engine cannot take an unregulated increase in fuel flow, but must take it according to a schedule determined by certain parameters. These parameters, in the case illustrated, are speed, temperature and $P_{t3}$. The mechanism 98 is provided in order to determine the desired fuel flow upon acceleration, for all engine operating conditions.

The mechanism 98 accomplishes its purpose by determining the pressure $P_8$, which is representative of desired fuel flow, and comparing it against the actual fuel flow past valve 42 as sensed by the pressure differential $P_2 - P_3$. Whenever the actual fuel flow becomes too great, the member 66 is moved clockwise about pivot 92, thereby opening servo-valve 94 some amount off of seat 96. It should be pointed out at this time, that the servo 94 is actuated only during periods of acceleration.

In order to more clearly explain the operation of member 66 and servo 94, let it be assumed that the engine is under a condition of acceleration. During this time, the rotational speed of tubular member 148 is increasing thereby causing pressure $P_6$ in chamber 126 to increase and move cam 100 upwardly. As cam 100 so moves, valve 125 is moved to the left causing a greater restriction to flow from chamber 134 to chamber 136. Additionally, if the temperature increases, probe 110 will move valve 125 further to the left by means of cam 100. Consequently, $P_8$, which is directed to chamber 74 is a function of the speed and temperature and the differential of $P_8$ to $P_3$ is used as an indication of the desired fuel flow to the engine.

Contrasted to the signal is the one indicating the actual fuel flow. That is, the pressure differential of $P_2$ to $P_3$ is an indication of the actual fuel flow past valve 42.

The differential of $P_8$ to $P_3$ is placed across diaphragm 68 while the differential of $P_2$ to $P_3$ is placed across diaphragm 70 which is larger than diaphragm 68. Accordingly, whenever the force created by the actual fuel flow past valve 42 becomes too great, and unbalances the force created by the desired fuel flow, servo valve 94 is opened and an appropriate quantity of fuel is bypassed by valve 226.

Conduit 262 which communicates with conduit 257 is, during periods of flow, at a pressure $P_5$ due to restriction 264. Conduit 266 hydraulically connects one side of valve 226 to conduit 262 and is at the same pressure $P_5$. Therefore, as servo 94 opens in accordance with the signal input of the computing mechanism 98, $P_5$ drops due to the flow by servo valve 94 to the cavity pressure $P_9$. This results in valve 226 being forced open due to the pressure $P_2$ of chamber 248 overcoming the combined force of spring 228 and pressure $P_5$. This in turn causes pressure $P_2$ to drop some amount; however, the valve 44 is not affected by this drop, since both $P_6$ and $P_7$ drop accordingly and the resulting pressure differential remains a true indication of speed. Therefore, as valve 226 opens, fuel is bypassed back to the tank in accordance with the maximum acceleration line determined by the mechanism 98.

*Engine Deceleration*

When less power is demanded, the operator rotates lever 210 clockwise, allowing the valve 44 to move to its furthermost position to the left. The point at which the motion of valve 44 is arrested depends on the placement of the minimum flow stop member 166. The member 166 is of course adjusted so as to provide a safe minimum fuel flow during deceleration without having an engine flame out.

Figure 2:
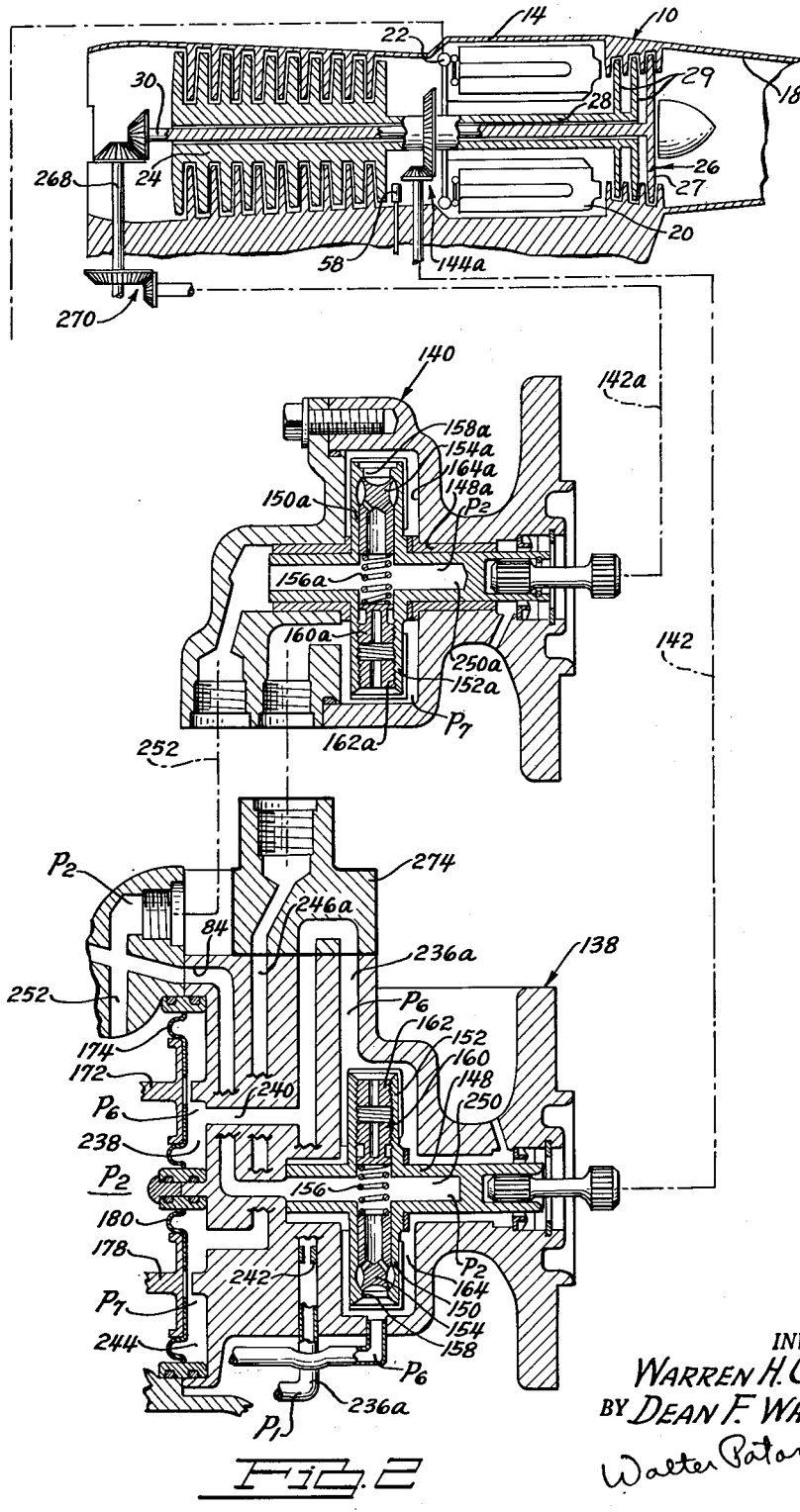
FIGURE 2 is a fragmentary view in cross-section illustrating the minor changes required to adapt the fuel control illustrated in FIGURE 1 to a typical turboshaft engine.

FIGURE 2 illustrates in fragmentary cross-section the adaptation of this invention to a turboshaft engine. The elements which are like or similar to those of FIGURE 1 are identified with like numerals. From a comparison of FIGURES 1 and 2, it will be seen that conduit 236, which formerly communicated with chamber 164a of speed sense 140, is replaced with a conduit 236a which communicated with chamber 164a of speed sense 140, is replaced with a conduit 236a which communicates with chamber 164 of speed sense 138. Conduit 240, however, still hydraulically connects conduit 236a with chamber 238. Speed sense 140, as in FIGURE 1, communicates with chamber 254 and conduit 84 by means of conduit 252; however, the chamber 164a now communicates with chamber 244, instead of 238, by means of conduit 246a.

Member 148 of speed sense 138 is adapted to be driven in accordance with the compressor speed, as by transmission 142 and gear box 144a, while speed sense 140 is rotated in accordance with the speed of the output shaft 268 by means of gear box 270 and transmission 142a. Generally, the operation of the fuel control is the same for either a turboprop, as in FIGURE 1, or a turboshaft as illustrated in FIGURE 2.

It will be noted that for all practical purposes all details and exterior connections are the same as between the turboprop and turboshaft versions of the fuel control. This is achieved by the use of small cap members 272 and 274 of FIGURES 1 and 2, respectively. When 272 is used, the hydraulic network within the control is such that the operator, when selecting a power lever angle, actually preselects a desired compressor 24 (gas producer) speed. If adapter member 274 is used, the hydraulic network is changed so that the operator selects a desired output shaft 268 speed by positioning the power lever 210.

If a power plant is to be used as a turboprop, the speed which is selected must be that of the compressor, since this will determine the power of the power plant. The speed sense connected to the propeller or power turbine is used strictly as a propeller overspeed device which will reduce the selected fuel flow to the burners in order to bring the speed of the propeller and power turbine within safe operating speeds. Therefore, it becomes apparent that in a turboprop engine the fuel is basically metered in accordance with the compressor speed.

If, however, a power plant is to be used as a turboshaft, the speed selection must be made with reference to the output shaft. In this case, the speed sense connected to the compressor is used as the overspeed device; this will reduce the fuel flow to the engine when loads are suddenly reduced on the output shaft, preventing output shaft and possibly compressor overspeeds. In view of this requirement, it follows that the fuel is basically metered in accordance with the output shaft speed and load in a turboshaft engine.

Many engines which are designed to be used as turboprops are capable of being used, with slight modifications, as turboshafts. A fuel control which is designed for one will have the same physical requirements as to space, weight and location at if designed for the other. Therefore, it becomes evident that a fuel control constructed in accordance with this invention is capable of adapting itself to either type of engine without the necessity of relocating or changing any major components, except for the small hydraulic adapter members 272 and 274. If the fuel control were not constructed according to the invention, it would be necessary to relocate various speed sensing devices and change the internal hydraulic circuitry in order to switch the speed sensing means and yet retain a physical package or shape adaptable to the particular engine; this would mean that a fuel control designed for a turboprop could not be used with a turboshaft power plant.

A turboprop and turboshaft application of the invention have been discussed in order to more clearly illustrate the extreme conditions of which the invention is capable of adaptation. It is of course, apparent that the considerations for a turbojet engine would be like that for the turboprop illustrated in FIGURE 1. Accordingly, if the invention were to be used on a turbojet engine, the various connections would be made as also illustrated in FIGURE 1.

Although but one embodiment of the invention has been disclosed, it is apparent that other modifications are possible within the scope of the appended claims.

What we claim as our invention is:

1. A fuel control for a free-shaft turbine engine having a free turbine and a compressor with a driving turbine therefor, comprising a housing, an unmetered fuel inlet and a metered fuel outlet in said housing, a conduit connecting said inlet and outlet, a variable orifice valve member adapted to variably restrict the fuel flow through said conduit in accordance with compressor pressure, a second valve member adapted to meter the fuel flow through said conduit in accordance with compressor speed, a pressure responsive unmetered fuel bypass valve, conduit means directing a pressure signal created in part by metered fuel pressure to said pressure responsive bypass valve, a servo valve adapted to at times reduce in varying degrees the magnitude of said pressure signal, and a force balance system responsive to the fuel flow past said variable orifice valve member for controlling the position of said servo valve.

2. A fuel control for a free-shaft turbine engine having a free turbine and a compressor with a driving turbine therefor, comprising a housing, an unmetered fuel inlet and a metered fuel outlet in said housing, a conduit connecting said inlet and outlet, a first valve member adapted to variably restrict the fuel flow through said conduit in accordance with compressor pressure, a second valve member downstream of said first valve member and adapted to meter the fuel flow through said conduit in accordance with compressor speed, a pressure responsive unmetered fuel bypass valve, conduit means directing a pressure signal created in part by metered fuel pressure to said pressure responsive bypass valve, a servo valve adapted to at times reduce in varying degrees the magnitude of said pressure signal, and a force balance system responsive to both the fuel flow past said first valve member and compressor speed for controlling the position of said servo valve.

3. A fuel control for a free-shaft turbine engine having a free turbine and a compressor with a driving turbine therefor, comprising a housing, an unmetered fuel inlet and a metered fuel outlet in said housing, a conduit connecting said inlet and outlet, a first valve member adapted to variably restrict the fuel flow through said conduit in accordance with compressor discharge pressure, a second valve member downstream of said first valve member and adapted to meter the fuel flow through said conduit in accordance with compressor speed, a pressure responsive unmetered fuel bypass valve, conduit means directing a pressure signal created in part by metered fuel pressure to said pressure responsive bypass valve, a servo valve adapted to at times reduce in varying degrees the magnitude of said pressure signal, a force balance system responsive to both the fuel flow past said first valve member and compressor speed for controlling the position of said servo valve, and temperature responsive means for varying the effect of said compressor speed on said force balance system in accordance with temperature.

4. A fuel control for a free-shaft turbine engine having a free turbine and a compressor with a driving turbine therefor, comprising a housing, an unmetered fuel inlet and a metered fuel outlet in said housing, a first conduit connecting said inlet and outlet, a spring loaded valve in said conduit, a spring biased fuel bypass valve communicating with said first conduit upstream of said spring loaded valve, a variable orifice valve member in said conduit downstream of said spring loaded valve, first pressure responsive means responsive to compressor pressure and operatively connected to said variable orifice valve member for positioning said variable orifice valve member in accordance with compressor discharge pressure, an acceleration fuel bypass valve communicating with said first conduit intermediate of said spring loaded valve and said variable orifice valve member, a variably positioned governor valve in said first conduit downstream of said variable orifice valve member, first and second centrifugally positioned valve means for creating a first and second hydraulic signal indicative of the speed of rotation of said free turbine and compressor respectively, second and third pressure responsive means connected to said governor valve, a second conduit communicating between said first centrifugally positioned valve and said second pressure responsive means in a manner so as to direct said first pressure signal to said second pressure responsive means and thereby position said governor valve in accordance therewith, a third conduit communicating between said second centrifugally positioned valve and said third pressure responsive means in a manner so as to direct said second pressure signal to said third pressure responsive means and thereby position said governor valve in accordance therewith, a pressure responsive servo valve for controlling the position of said acceleration fuel bypass valve, a fourth conduit communicating between said first conduit intermediate of said spring loaded valve and said variable orifice valve member and said pressure responsive servo valve, a fifth conduit communicating between said first conduit intermediate of said variable orifice valve member and said governor valve and said pressure responsive servo valve, said fourth and fifth conduits serving to sense the pressure differential across the variable orifice valve member and apply said pressure differential to said servo valve as a force indicative of fuel flow past said variable orifice valve member, a sixth conduit communicating with a source of relatively high fuel pressure and adapted to direct said pressure to said servo valve, a second variable orifice valve member for controlling the flow through said sixth conduit and consequently determine the magnitude of said pressure directed to said servo valve by said sixth conduit, a three dimensional cam member adapted to be in continuous contact with said second variable orifice valve member so as to position said second variable orifice valve member in accordance with the position of said cam, a temperature responsive motor member for rotating said cam member in accordance with variations in temperature, piston means responsive to the speed of rotation of said compressor for positioning said cam member axially in accordance therewith, manually positioned cam means cooperating with said third pressure responsive means for creating a signal indicative of the requested fuel flow to said engine, and adjustably positioned stop means for determining the absolute minimum permissible fuel flow past said governor valve.

References Cited in the file of this patent

UNITED STATES PATENTS

| 2,738,644 | Alford | Mar. 20, 1956 |
| 2,809,492 | Arkawy | Oct. 15, 1957 |
| 2,939,280 | Farkas | June 7, 1960 |
| 2,989,849 | Torell | June 27, 1961 |

FOREIGN PATENTS

| 204,244 | Australia | Aug. 9, 1956 |
| 804,702 | Great Britain | Nov. 19, 1958 |